United States Patent [19]

Iyori et al.

[11] Patent Number: 4,543,343
[45] Date of Patent: Sep. 24, 1985

[54] CERAMICS FOR CUTTING TOOLS

[75] Inventors: Yusuke Iyori, Fukaya; Norio Takahashi, Omiya, both of Japan

[73] Assignee: Hitachi Metals, Ltd., Tokyo, Japan

[21] Appl. No.: 584,446

[22] Filed: Feb. 28, 1984

[30] Foreign Application Priority Data

Jun. 30, 1983 [JP] Japan .................. 58-118480

[51] Int. Cl.⁴ .................. C04B 35/10; C04B 35/46; C04B 35/56
[52] U.S. Cl. .................. 501/87; 51/309; 501/96
[58] Field of Search .................. 501/87, 96; 51/309

[56] References Cited

U.S. PATENT DOCUMENTS

| | | | |
|---|---|---|---|
| 2,814,566 | 11/1957 | Glaser | 501/96 |
| 4,022,584 | 5/1977 | Rudy | 501/98 |
| 4,063,908 | 12/1977 | Ogawa et al. | 501/87 |
| 4,356,272 | 10/1982 | Kanemitsu et al. | 501/87 |

*Primary Examiner*—Mark L. Bell
*Attorney, Agent, or Firm*—Antonelli, Terry & Wands

[57] ABSTRACT

A ceramic material for cutting tools is provided. The ceramic material has a high thermal conductivity and an excellent resistance to chipping failure and comprises a total of 10 to 40% by weight of titanium boride and titanium carbide, and 0.5 to 10% by weight of zirconia, the balance being alumina and incidental impurities.

4 Claims, 8 Drawing Figures

| | FEED PER BLADE mm/blade | | | | |
|---|---|---|---|---|---|
| | 0.1 | 0.2 | 0.3 | 0.4 | 0.5 |
| $Al_2O_3$ | ○ | ○ | × | × | × |
| $Al_2O_3$-2.5$TiB_2$-2.5TiC-$ZrO_2$ | ○ | ○ | × | × | × |
| $Al_2O_3$-5$TiB_2$-5TiC-$ZrO_2$ | ○ | ○ | ○ | ○ | × |
| $Al_2O_3$-10$TiB_2$-10TiC-$ZrO_2$ | ○ | ○ | ○ | ○ | ○ |
| $Al_2O_3$-25$TiB_2$-25TiC-$ZrO_2$ | ○ | ○ | ○ | × | × |
| $Al_2O_3$-30TiC | ○ | ○ | ○ | × | × |

CERAMICS FOR CUTTING TOOLS

BACKGROUND OF THE INVENTION

1. Field of the Invention

This invention relates to ceramic materials, particularly suitable for use as cutting tools.

2. Description of the Prior Art

Cutting Tools made of alumina, well known as one of the ceramics for cutting tools, are excellent in abrasion resistance, but, on the other hand, have a disadvantage of being susceptible to chipping. For this reason, the improvement in toughness has been one of the main objectives of developmental work on ceramic tools from the early stage of their development until now. As one of solutions to the problem, there was invented a ceramic tool of an alumina-titanium carbide ($Al_2O_3$-TiC) type with an improved resistance to the chipping caused by thermal shock, in which alumina was incorporated with about 30% by weight of titanium carbide to reduce the size of crystal grains as well as to reduce the decline in thermal conductivity with the increase in temperature said decline originating from the inherent properties of alumina.

As compared with a so-called "white-type" ceramic tool made of alumina alone, the ceraminc tool of the $Al_2O_3$-TiC type has a higher toughness and a higher resistance to the chipping failure caused by thermal shock. As a consequence, this type of tool has exhibited its usefulness especially in such uses as turning of high-hardness materials and milling of cast iron materials, both of which are hardly machinable by means of "white" ceramic tools. However, even such a ceramic tool of an $Al_2O_3$-TiC type has a disadvantage of being susceptible to boundary abrasion in the area of machining a high-hardness material under such machining conditions that the temperature of cutting edges exceeds 1,200° C., because the high-temperature hardness of TiC incorporated in a considerable amount becomes lower than that of alumina, resulting in deterioration of the abrasion resistance of the tool.

SUMMARY OF THE INVENTION

The object of this invention is to provide a ceramic material for cutting tools, which has a high thermal conductivity and an excellent resistance to chipping failure, thus eliminating the disadvantages of the prior art.

The present invention is characterized by the incorporation of 0.1 to 10% by weight of $ZrO_2$ in a mixture comprising powdered alumina and a total of 10 to 40% by weight of $TiB_2$ and TiC.

DETAILED DESCRIPTION OF PREFERRED EMBODIMENTS

Figures 1, 2:
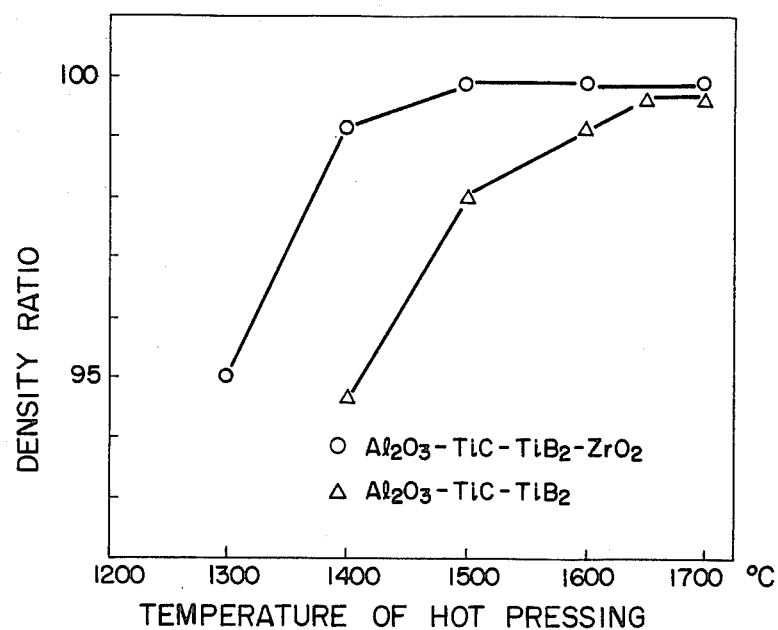
FIG. 1 is a graph showing the effect of $ZrO_2$ upon the sinterability.
FIG. 2 is a graph showing the toughness of cutting tools at high temperatures.
Figures 1, 2:
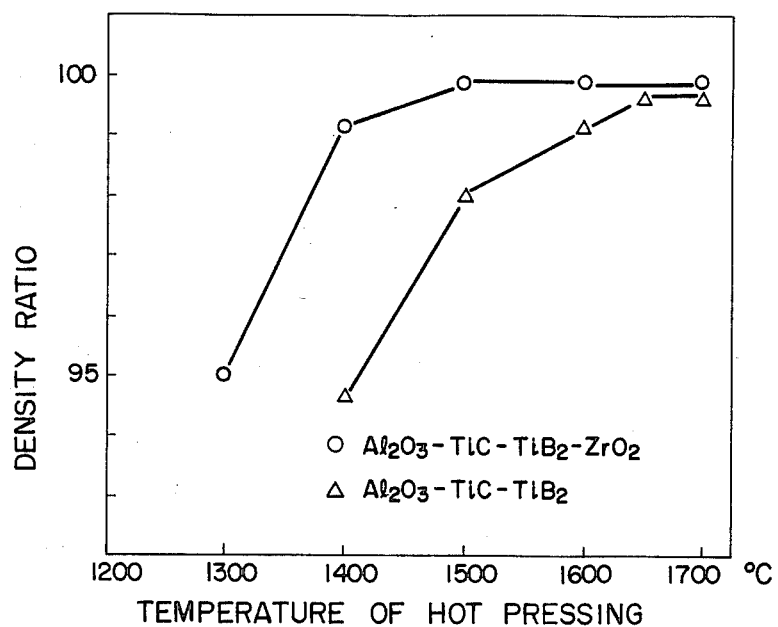

The ceramic material of this invention has a microstructure in which $TiB_2$, TiC and $ZrO_2$ are dispersed in $Al_2O_3$ similarly to TiC in ceramics of the $Al_2O_3$-TiC type and, as known well, play roles of preventing the growth of alumina grains to increase the toughness as well as hindering the growth of tiny cracks. However, when hardly sinterable $TiB_2$ is added in a large amount to a sintered $Al_2O_3$-TiC mixture, there occurs an increase in the firing temperature, resulting in an undesirable growth of the grain size to around 10 μm. The addition of $ZrO_2$ according to this invention eliminates such a difficulty and is effective in improving the sinterability of $Al_2O_3$-$TiB_2$-TiC ceramics. For instance, as seen from FIG. 1, when $ZrO_2$ is added, the hot-pressing temperature necessary to achieve a density ratio of 99.5% or more, is at least 100° C. lower than that in the case where no $ZrO_2$ is added. Moreover, according to this invention it is possible to improve further the sinterability and to minimize the growth of grains by the addition of a total of 0.05 to 2.5% by weight of a sintering aid such as magnesia (MgO) and aluminum nitride (AlN).

The ceramics of this invention are obtained normally by the hot pressing of a powder mixture having the composition in the range given above. The same result is attained by hot pressing followed by hydrostatic pressing while heating, or alternatively by firing under ordinary pressure followed by hot pressing under hydrostatic pressure.

Figure 3:
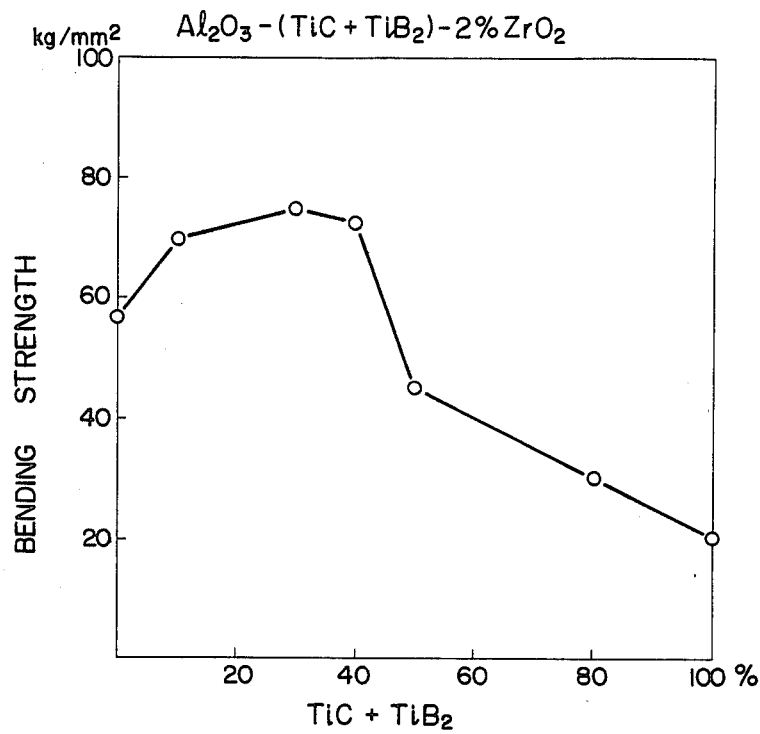
FIG. 3 is a graph showing the toughness at normal temperatures.
Figure 4:
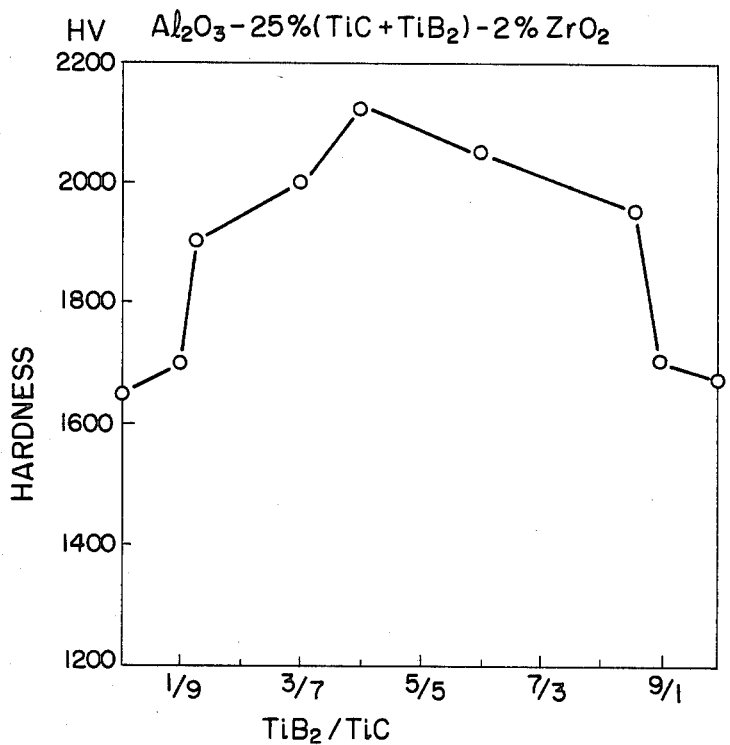
FIG. 4 is a graph showing the relationship between the hardness and the $TiB_2$/TiC ratio.

The reason for limiting the total amount of $TiB_2$ and TiC to the range of from 10 to 40% by weight in this invention is such that if the amount is below 10%, the resulting ceramic becomes inferior in toughness at high temperatures, while if it exceeds 40%, the toughness at ordinary temperature becomes inferior. For instance, the results shown in FIG. 2 were obtained from the evaluation test of toughness at high temperatures, which was carried out by machining a cast iron piece, used as an example of the material to be milled, by means of a face milling cutter under such conditions that the milling speed was 500 m/minute and the depth of cut was 1.5 mm. As is seen from FIG. 2, the high-temperature toughness of a ceramic tool containing less than 5% in total or more than 50% in total of TiC and $TiB_2$ is inferior to that of a ceramic tool containing 10 to 20% in total of TiC and $TiB_2$. As to the toughness at ordinary temperature, test results obtained were shown in FIG. 3. As is seen from FIG. 3, when the total TiC and $TiB_2$ content is below 10% or above 40%, the toughness at ordinary temperature is rapidly decreased. As is apparent from the results shown in FIGS. 2 and 3, it is desirable that the total amount of TiC and $TiB_2$ be in the range of from 10 to 40%. As is clear from FIG 4, it is more desirable to limit the weight ratio of $TiB_2$ to TiC to the range of from 0.15 to 6.0 in order to increase markedly the hardness and, hence, to improve the abrasion resistance of the tool made from such a ceramic.

As for $ZrO_2$, a preferable amount is in the range of from 0.5 to 10%, because if the amount is below 0.5%, the ceramic composition hardly exhibits any effect on sinterability as shown in the Table below, while if the amount exceeds 10%, the resistance of the ceramics to thermal shock will be decreased.

| Composition | Optimum hot-pressing temperature (°C.) |
|---|---|
| $Al_2O_3$—12 TiC—12 $TiB_2$—0.1 $ZrO_2$ | 1650 |
| $Al_2O_3$—12 TiC—12 $TiB_2$—0.3 $ZrO_2$ | 1650 |
| $Al_2O_3$—12 TiC—12 $TiB_2$—0.5 $ZrO_2$ | 1580 |
| $Al_2O_3$—12 TiC—12 $TiB_2$—2 $ZrO_2$ | 1500 |
| $Al_2O_3$—12 TiC—12 $TiB_2$—5 $ZrO_2$ | 1450 |

The total amount of powdered MgO and AlN is limited to the range of from 0.05 to 2.5% by weight, because if the total amount is below 0.05% by weight, no effect on the reduction in the crystal grain size of $Al_2O_3$ is seen, while if it exceeds 2.5% by weight, a spinel layer is formed at grain boundaries and embrittles the ceramics.

Figure 5:
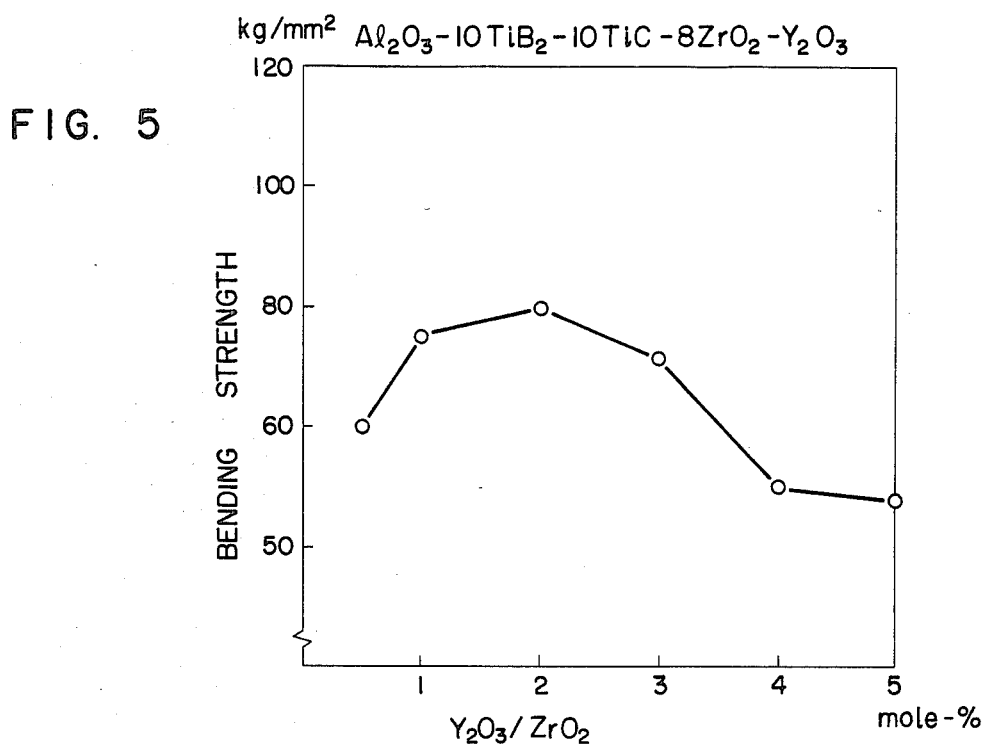
FIG. 5 is a graph showing the effectiveness of $ZrO_2$ to improve the toughness.

The purpose of limiting the amount of $Y_2O_3$ to the range of from 1.0 to 3.0 mol % based on $ZrO_2$ is to make $ZrO_2$ in the crystal form of tetragonal (t phase) for the most part, thereby to improve the breaking strength of the ceramics, as shown in FIG. 5, because if the amount of $Y_2O_3$ is below 1.0%, the crystal form of $ZrO_2$ becomes mainly monoclinic (m phase), while if it is above 3.0%, most of the $ZrO_2$ crystals become cubic (c phase), the effect of $Y_2O_3$ being insufficient in these two cases.

The invention will be illustrated below with reference to the following Examples.

EXAMPLE 1

To a mixture comprising 10% by weight of powdered $TiB_2$ of 1.2 μm in an average particle size, 10% by weight of TiC of 0.9 μm in an average particle size, 5% by weight of powdered $ZrO_2$ of 0.1 μm in an average particle size, and the balance of powdered $Al_2O_3$, 0.1 μm in an average particle size, were added 0.5% by weight of MgO and 1.0% by weight of AlN. The resulting mixture was ground and intermixed for 48 hours in ethyl alcohol in a ball mill made of alumina. The ground mixture was dried in vacuum, molded under a pressure of 2 tons/cm², and subjected to pressure sintering keeping the molded piece at 1,500° C. in vacuum for 10 minutes while applying a pressure of 200 kg/cm² to obtain a sintered body.

Figure 6:
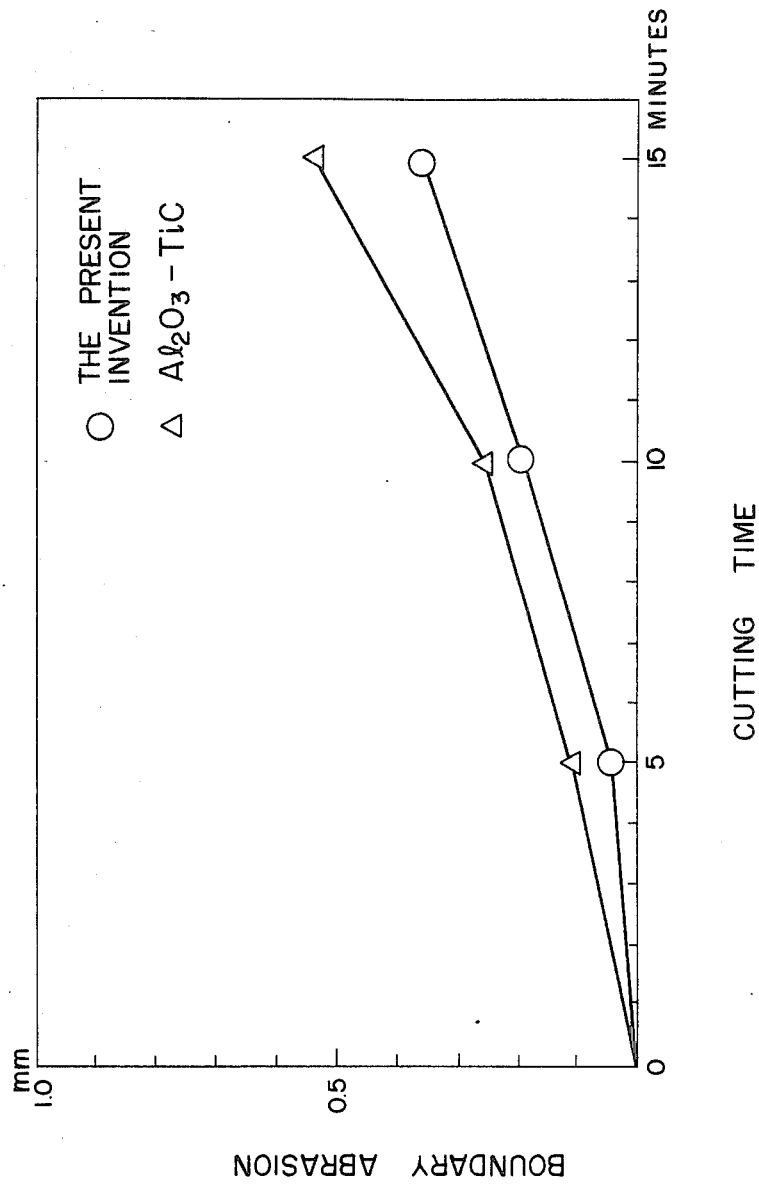
FIG. 6 is a characteristics graph showing the results of cutting test performed on each of the ceramics of this invention and a conventional ceramics of the $Al_2O_3$-TiC type.

SNGN 453 tip for cutting tools was prepared from the sintered body above. Cutting test was performed, using cold working steel (Hs 65) as a piece to be machined and an $Al_2O_3$-30% TiC tip, which has been widely used, as a reference. The cutting speed was 70 m/minute, the depth of cut 1.5 mm for both the tips, and the feed 0.4 mm/rev. As compared with the conventional $Al_2O_3$-TiC ceramics, the ceramics of this invention showed lower boundary abrasion, indicating superior cutting performance as shown in FIG. 6.

EXAMPLE 2

A mixture was prepared by blending 15% by weight of powdered $TiB_2$, 10% by weight of powdered TiC, 8% by weight of powdered $ZrO_2$, 0.29% by weight of powdered $Y_2O_3$, and the balance of powdered $Al_2O_3$. The mixture was ground and intermixed in water in a ball mill made of alumina for 48 hours. The ground mixture was dried in vacuum, molded under a pressure of 2 tons/cm², and subjected to pressure sintering by keeping the molded piece at 1,500° C. in vacuum under a pressure of 200 kg/cm² to obtain a sintered body.

A test piece, 8×4×25 mm, was cut out of the sintered body above and tested for bending strength. The average bending strength was 85 kg/mm² which proved that the ceramics of this invention has a far higher strength than that of a commercial $Al_2O_3$-30% TiC ceramics.

Figure 7A:
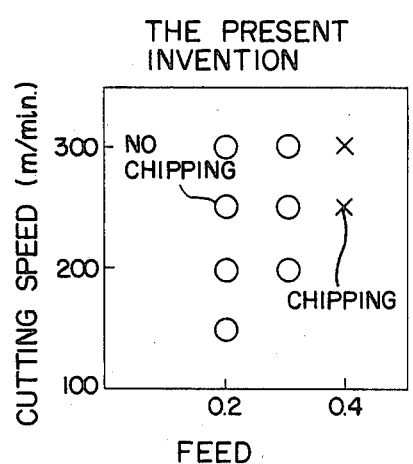
FIGS. 7a and 7b are, respectively, graphs of the results of test performed on the ceramics of this invention and a conventional ceramics of the $Al_2O_3$-TiC type by using a milling cutter.
Figure 7B:
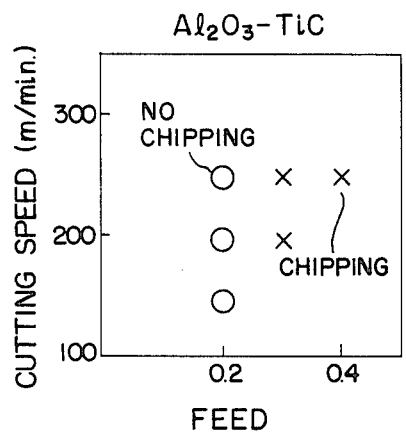

SNGN 432 tip for cutting tools was prepared from the above-mentioned sintered body. Cutting test was performed by means of a face milling cutter, using SCM 440 as a material to be machined and a commercial $Al_2O_3$-30% TiC tip as a reference. The depth of cut was 2 mm for both the tips. As summarized in FIGS. 7a and 7b, the ceramics of this invention showed a broader machinable region than that of the commercial $Al_2O_3$-TiC ceramics.

As is apparent from the foregoing Examples, the ceramics for cutting tools according to this invention are very useful from industrial viewpoint, because they show excellent characteristics as the ceramics for so-called "black-type" tools, as evidenced by a low boundary abrasion and a high toughness.

What is claimed is:

1. A ceramic material for cutting tools comprising 10 to 40% by weight in total of titanium boride ($TiB_2$) and titanium carbide (TiC) with the weight ratio of titanium boride to the titanium carbide being in the range of from 0.15 to 6.0, and 0.5 to 10% by weight of zirconia ($ZrO_2$), the balance being alumina ($Al_2O_3$) and incidental impurities.

2. The ceramic material for cutting tools according to claim 1, further comprising at least one of aluminum nitride (AlN) and magnesia (MgO) as sintering aid in a total amount of 0.05 to 2.5% by weight.

3. A ceramic material for cutting tools comprising 10 to 40% by weight in total of titanium boride (TiB) and titanium carbide (TiC) with the weight ratio of the titanium boride to the titanium carbide being within the range of from 0.15 to 6.0, 0.5 to 10% by weight of zirconia ($ZrO_2$), and 1.0 to 3.0 mole %, based on the content of zirconia, of yttria ($Y_2O_3$), the balance being alumina ($Al_2O_3$) and incidental impurities.

4. The ceramic material for cutting tools according to claim 3, further comprising at least one of aluminum nitride (AlN) and magnesia (MgO) as sintering aid in a total amount of 0.05 to 2.5% by weight.

* * * * *